US012624835B2

(12) United States Patent
Ishii et al.

(10) Patent No.: US 12,624,835 B2
(45) Date of Patent: May 12, 2026

(54) INSPECTION DEVICE

(71) Applicant: Azbil Corporation, Tokyo (JP)

(72) Inventors: Shigeki Ishii, Tokyo (JP); Kayo Suzuki, Tokyo (JP); Kenichi Yamagata, Tokyo (JP)

(73) Assignee: Azbil Corporation, Tokyo (JP)

( * ) Notice: Subject to any disclaimer, the term of this patent is extended or adjusted under 35 U.S.C. 154(b) by 818 days.

(21) Appl. No.: 18/081,880

(22) Filed: Dec. 15, 2022

(65) Prior Publication Data

US 2023/0235880 A1    Jul. 27, 2023

(30) Foreign Application Priority Data

Jan. 21, 2022    (JP) ................................. 2022-007699

(51) Int. Cl.
| | |
|---|---|
| *F23M 11/04* | (2006.01) |
| *F23N 5/08* | (2006.01) |
| *G01J 5/00* | (2022.01) |
| *G01J 1/42* | (2006.01) |

(52) U.S. Cl.
CPC ............. *F23M 11/045* (2013.01); *F23N 5/08* (2013.01); *F23N 5/082* (2013.01); *G01J 5/0014* (2013.01); *F23N 2227/22* (2020.01); *F23N 2229/04* (2020.01); *G01J 1/429* (2013.01)

(58) Field of Classification Search
CPC ......... F23M 11/045; F23N 5/08; F23N 5/082; F23N 2227/22; F23N 2229/04; G01J 1/429; G01J 5/0014
USPC ........................................................ 431/75
See application file for complete search history.

(56) References Cited

U.S. PATENT DOCUMENTS

| | | | | |
|---|---|---|---|---|
| 5,365,223 | A | * 11/1994 | Sigafus | F23N 5/12 |
| | | | | 340/693.1 |
| 2006/0186352 | A1* | 8/2006 | Amemiya | G03F 7/70558 |
| | | | | 250/492.1 |
| 2017/0219209 | A1* | 8/2017 | Suzuki | F23N 1/042 |
| 2018/0100672 | A1* | 4/2018 | Smith | F24H 9/2035 |
| 2020/0309372 | A1 | 10/2020 | Watanabe et al. | |

FOREIGN PATENT DOCUMENTS

| | | | |
|---|---|---|---|
| JP | H01-094751 U | 6/1989 | |
| JP | H10-267273 A | 10/1998 | |
| JP | 2017-138018 A | 8/2017 | |
| JP | 2020-165830 A | 10/2020 | |
| JP | 2020165825 A | * 10/2020 | ................ G01J 1/18 |

OTHER PUBLICATIONS

JP-2020165825-A—Translation (Year: 2020).*

* cited by examiner

*Primary Examiner* — Steven B McAllister
*Assistant Examiner* — Benjamin W Johnson

(57) ABSTRACT

To grasp a state of a combustion apparatus based on a flame state of a burner, a discharge number measurement unit measures the number of discharges of a flame sensor per unit time. A light emission information generation unit generates, as light emission information, information obtained based on a value obtained by dividing a total (accumulation) of the number of discharges per unit time measured by the discharge number measurement unit by a total measurement time. A determination unit determines the state of the combustion apparatus to be inspected based on the light emission information generated by the light emission information generation unit as described above.

16 Claims, 6 Drawing Sheets

INSPECTION DEVICE

CROSS REFERENCE TO RELATED APPLICATIONS

This patent application claims the benefit of foreign priority to Japanese Patent Application No. JP 2022-007699 filed on Jan. 21, 2022, the disclosure of which is herein incorporated by reference in its entirety.

BACKGROUND OF THE INVENTION

The present disclosure relates to an inspection device that determines a state of a combustion apparatus.

In a combustion apparatus such as a combustion furnace, a drying furnace, and a boiler, a flame sensor that detects the presence or absence of a flame is used to control combustion in a combustion chamber. In general, an ultraviolet ray detection tube or the like is used as the flame sensor. The ultraviolet ray detection tube is a discharge tube in which, in a state in which a high voltage is applied between a pair of electrodes provided in a tube made of glass, discharge occurs between the electrodes when ultraviolet rays radiated from a flame are incident. A discharge current is obtained from the ultraviolet ray detection tube when the ultraviolet rays radiated from the flame are detected. A flame voltage obtained by integrating the discharge current and converting the discharge current into a voltage output is used for ignition control of a burner or the like (see PTL 1).

Incidentally, because a voltage to be applied to the flame sensor (ultraviolet ray detection tube) is generated from a commercial power supply voltage, a discharge current may also increase or decrease depending on a magnitude of a level of the power supply voltage and may not always be the same flame voltage. In order to eliminate an influence of fluctuation of the power supply voltage, a technique using a discharge probability calculated based on the number of times of application of a drive voltage to the flame sensor and the number of times of discharge from the flame sensor detected during the application of the drive voltage has been proposed (see PTL 2). The technique determines an ultraviolet ray intensity level based on the discharge probability.

CITATION LIST

Patent Literature

[PTL 1] JP-A-2017-138018
[PTL 2] JP-A-2020-165830

BRIEF SUMMARY OF THE INVENTION

However, in the above-described related art, there is a problem that it is not easy to grasp a state of the combustion apparatus, such as what kind of abnormality occurred in the combustion apparatus, based on a flame state of the burner.

The present disclosure is made to solve the above-described problem, and an object of the present disclosure is to make it possible to grasp a state of a combustion apparatus based on a flame state of a burner.

An inspection device according to the present disclosure includes: a flame sensor configured to detect ultraviolet rays generated from a flame generated by a combustion apparatus; an application voltage generation unit configured to periodically apply a drive voltage to an electrode of the flame sensor; a discharge number measurement unit configured to measure the number of discharges of the flame sensor per unit time; a light emission information generation unit configured to generate, as light emission information, information obtained based on a value obtained by dividing a total of the number of discharges per unit time measured by the discharge number measurement unit by a total measurement time; and a determination unit configured to determine a state of the combustion apparatus based on the light Emission information.

In the inspection device cording to one configuration example, the light emission information generation unit is configured to generate, as the light emission information, a linear function expressed by a formula in which the total of the number of discharges per unit time measured by the discharge number measurement unit is divided by the total measurement time.

In the inspection device according to one configuration example, the determination unit is configured to determine the state of the combustion apparatus by using the light emission information generated by the light emission information generation unit as a reference at a normal time, using the light emission information generated by the light emission information generation unit as determination information at a time of determination, and comparing the reference with the determination information.

In the inspection device according to one configuration example, the combustion apparatus includes a pilot burner and a main burner, ignites the pilot burner, and thereafter ignites the main burner with a pilot flame of the ignited pilot burner, and the determination unit is configured to determine the state of the combustion apparatus based on a first comparison result obtained by comparing the reference with the determination information in a first period from start of ignition of the pilot burner to ignition of the main burner, and a second comparison result obtained by comparing the reference with the determination information in a second period after the main burner is ignited.

In the inspection device according to one configuration example, the determination unit is configured to determine the state of the combustion apparatus based on a third comparison result obtained by comparing an ignition time point of the pilot burner that is configured to be identified by the reference and an ignition time point of the pilot burner that is configured to be identified by the determination information in the first period from the start of the ignition of the pilot burner to the ignition of the main burner, in addition to the first comparison result and the second comparison result.

In the inspection device according to the one configuration example, the determination unit is configured to determine the state of the combustion apparatus as being such that a flow rate or an air-fuel ratio of a fuel and air supplied to the pilot burner is deviated from a normal value in a case in which the first comparison result indicates that the determination information is smaller than the reference and the second comparison result indicates that the reference and the determination information are the same as each other.

In the inspection device according to the one configuration example, the determination unit is configured to determine the state of the combustion apparatus as being such that a flow rate or an air-fuel ratio of a fuel and air supplied to the main burner is deviated from a normal value in a case in which the second comparison result indicates that the determination information is smaller than the reference and the first comparison result indicates that the reference and the determination information are the same as each other.

In the inspection device according to the one configuration example, the determination unit is configured to determine the state of the combustion apparatus as being such that a flow rate or an air-fuel ratio of a fuel and air supplied to the main burner fluctuates in a case in which the first comparison result indicates that the reference and the determination information are the same as each other and the second comparison result fluctuates within the second period.

In the inspection device according to the one configuration example, the determination unit is configured to determine the state of the combustion apparatus as being such that a flow rate or an air-fuel ratio of a fuel and air supplied to the pilot burner fluctuates in a case in which the second comparison result indicates that the reference and the determination information are the same as each other and the first comparison result fluctuates within the first period.

In the inspection device according to the one configuration example, the determination unit is configured to determine the state of the combustion apparatus as being such that supply of air or supply of a fuel fluctuates in an unstable state in a case in which a magnitude relation between the reference and the determination information is alternately inverted in the first comparison result and a magnitude relation between the reference and the determination information is alternately inverted in the second comparison result.

In the inspection device according to the one configuration example, the determination unit is configured to determine the state of the combustion apparatus as being such that a detection sensitivity of the flame sensor has decreased in a case in which the first comparison result indicates that the determination information is smaller than the reference and the second comparison result indicates that the determination information is smaller than the reference.

In the inspection device according to the one configuration example, the determination unit is configured to determine the state of the combustion apparatus as being such that the number of suspected discharges caused by deterioration of the flame sensor has increased in a case in which the first comparison result indicates that the determination information is larger than the reference and the second comparison result indicates that the determination information is larger than the reference.

As described above, according to the present disclosure, the information obtained based on the value obtained by dividing the total of the number of discharges per unit time by the total measurement time is generated as the light emission information, and the state of the combustion apparatus to be inspected is determined based on the light emission information, and thus the state of the combustion apparatus can be grasped based on a flame state of a burner.

DETAILED DESCRIPTION OF THE INVENTION

Figure 1:
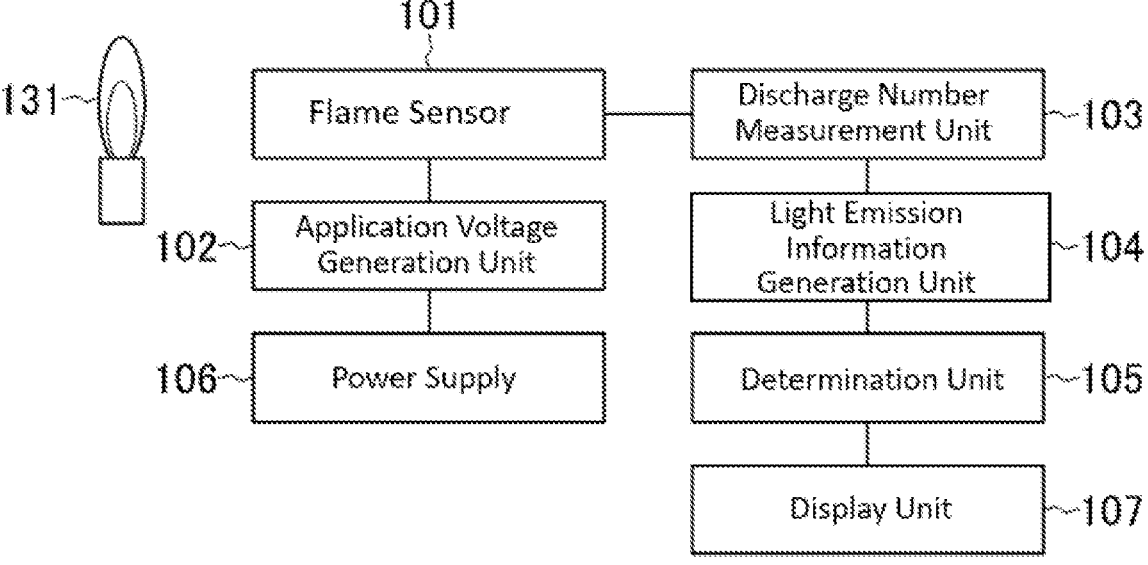
FIG. 1 is a configuration diagram showing a configuration of an inspection device according to an embodiment of the present disclosure.

An inspection device according to an embodiment of the present disclosure will be described below with reference to FIG. 1. The inspection device includes a flame sensor 101, an application voltage generation unit 102, a discharge number measurement unit 103, light emission information generation unit 104, and a determination unit 105.

The flame sensor 101 detects ultraviolet rays emitted from a flame 131 of a burner of a target combustion apparatus. The flame sensor 101 may be constituted by, for example, an ultraviolet ray detection tube that detects ultraviolet rays in a predetermined wavelength range. The ultraviolet ray detection tube includes an anode electrode and a cathode electrode disposed in a tube made of glass.

The application voltage generation unit 102 periodically applies a drive voltage to the electrodes of the flame sensor 101. The application voltage generation unit 102 boosts, for example, commercial alternating current voltage to be supplied from a power supply 106 to a predetermined value, and applies the boosted commercial alternating current voltage to the electrodes of the flame sensor 101.

The discharge number measurement unit 103 measures the number of discharges of the flame sensor 101 per unit time. The discharge number measurement unit 103 measures, for example, the number of discharges of the flame sensor 101 per 0.1 second, and accumulates the measured values for a set time (unit time, for example, 10 seconds) to obtain the number of discharges of the flame sensor 101 per unit time.

When any voltage is applied between the anode electrode and the cathode electrode of the ultraviolet ray detection tube that constitutes the flame sensor 101, an electric field is generated between the anode electrode and the cathode electrode. In this state, when ultraviolet rays collide with the cathode electrode, secondary electrons are emitted from the cathode electrode.

The emitted secondary electrons are accelerated by the electric field and fly to an anode electrode side. At this time, the secondary electrons collide with molecules or ions between the electrodes, causing an avalanche phenomenon in which a large number of electrons are generated. The large number of electrons generated by the avalanche phenomenon travel in an anode electrode direction due to the electric field and reach the anode electrode. The phenomenon is a discharge in the ultraviolet ray detection tube. When the discharge occurs, the voltage between the anode electrode and the cathode electrode decreases, and a current is generated. The generation of the current is measured by the discharge number measurement unit 103 connected to the flame sensor 101 constituted by the ultraviolet ray detention tube.

The light emission information generation unit 104 generates, as light emission information, information obtained based on a value obtained by dividing a total (accumulation) of the number of discharges per unit time measured by the discharge number measurement unit 103 by a total measurement time. The light emission information generation unit 104 may generate, as the light emission information, a linear function expressed by a formula in which the total of the number of discharges per unit time measured by the discharge number measurement unit 103 is divided by the total measurement time. In this case, as is well known, a slope of a graph expressed by the linear function indicates a light emission intensity of the flame 131. The light emission information generation unit 104 generates, for example, for every 10 seconds, light emission information (linear function) obtained based on a value obtained by dividing the number of discharges of the flame sensor 101 accumulated per 10 seconds by 10 seconds (total measurement time). Here, the linear function is an apparent linear (degenerated) function, and includes a case in which the slope is zero.

The determination unit 105 determines a state of the combustion apparatus to be inspected based on the light emission information generated by the light emission information generation unit 104. The determination unit 105 determines the state of the combustion apparatus by using the light emission information generated by the light emission information generation unit 104 as a reference at a normal time, using the light emission information generated by the light emission information generation unit 104 as determination information at a time of determination, and comparing the reference with the determination information. A determination result of the determination unit 105 is displayed on a display unit 107.

For example, the target combustion apparatus generally includes a pilot burner and a main burner, and ignites the pilot burner, and thereafter ignites the main burner with a pilot flame of the ignited pilot burner. With respect to the combustion device with such a configuration, the determination unit 105 determines the state of the combustion apparatus based on a first comparison result obtained by comparing the reference with the determination information in a first period from start of ignition of the pilot burner to ignition of the main burner, and a second comparison result obtained by comparing the reference with the determination information in a second period after the main burner is ignited.

In addition, the determination unit 105 determines the state of the combustion apparatus based on a third comparison result obtained by comparing an ignition time point of the pilot burner that is capable of being identified by the reference and an ignition time point of the pilot burner that is capable of being identified by the determination information in the first period from the start of the ignition of the pilot burner to the ignition of the main burner, in addition to the first comparison result and the second comparison result.

Hereinafter, the present disclosure will be described in more detail with reference to inspection examples. Hereinafter, an inspection for the combustion apparatus including the pilot burner and the main burner will be described with reference to FIGS. 2A to 2H. In the inspection, a linear function expressed by a formula in which a cumulative value obtained by accumulating the number of discharges measured per 0.1 second for 10 seconds is divided by 10 seconds (total measurement time) is obtained per 10 seconds. FIGS. 2A to 2H each show a graph of a linear function obtained per 10 seconds. These graphs can be displayed on the display unit 107 together with the determination results.

Figure 2A:
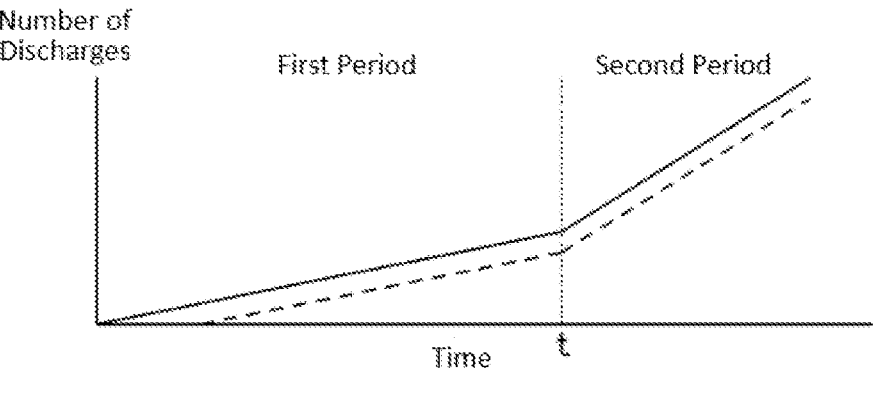
FIG. 2A is a diagram illustrating an inspection example by the inspection device according to the embodiment of the present disclosure.

In the combustion apparatus including the pilot burner and the main burner, for example, as indicated by a solid line in FIG. 2A, a slope of the graph changes between a first period from start of ignition of the pilot burner to ignition of the main burner up to time t and a second period after the ignition of the main burner after the time t. The solid line indicates a linear function that is a reference (light emission information) generated by the light emission information generation unit 104 when the combustion apparatus is in a normal state.

In general, when the combustion apparatus is in the normal state, the slope of the graph of each linear function obtained per 10 seconds remains the same in the first period, and the graph is expressed by one straight line in the first period. Similarly, when the combustion apparatus is in the normal state, the slope of the graph of each linear function obtained per 10 seconds remains the same in the second period, and the graph is expressed by one straight line. In addition, in the reference indicated by the solid line, the slope of the straight line indicates a light emission intensity of a flame in the normal state.

First Inspection Example

First, a first inspection example will be described with reference to FIG. 2A. In the example, a linear function (light emission information) generated by the light emission information generation unit 104 at a time of determination changes as indicated by a broken line in FIG. 2A. In the example, since a slope of the solid line and a slope of the broken line are the same as each other in the first period and a slope of the solid line and a slope of the broken line are the same as each other in the second period, it can be determined that there is no abnormality in the combustion apparatus (first comparison result and second comparison result). On the other hand, in the first period, the broken line indicates that a start timing is delayed (third comparison result), and it can be determined that ignition delay occurs in the combustion apparatus.

Second Inspection Example

Figure 2B:
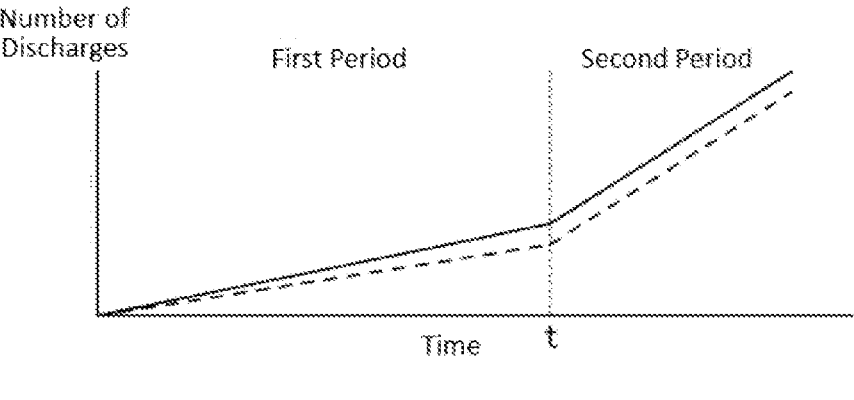
FIG. 2B is a diagram illustrating an inspection example by the inspection device according to the embodiment of the present disclosure.

Next, a second inspection example will be described with reference to FIG. 2B. In the example, a linear function (light emission information) generated by the light emission information generation unit 104 at a time of determination changes as indicated by a broken line FIG. 2B. In the example, a slope of a solid line and a slope of the broken line are the same as each other in the second period (second comparison result), and a slope of the broken line is smaller than a slope of the solid line in the first period (first comparison result). In this case, a decrease in a light emission intensity is shown in the change of the linear function (graph), and it can be determined that a flow rate or an air-fuel ratio of gas and air supplied to the pilot burner is deviated from a normal value. With respect to such a determination, it is conceivable to take measures such as checking the flow rate and a pressure of the gas and the air supplied to the pilot burner and checking a regulator, a blower motor, and an actuator of these supply systems.

Third Inspection Example

Figure 2C:
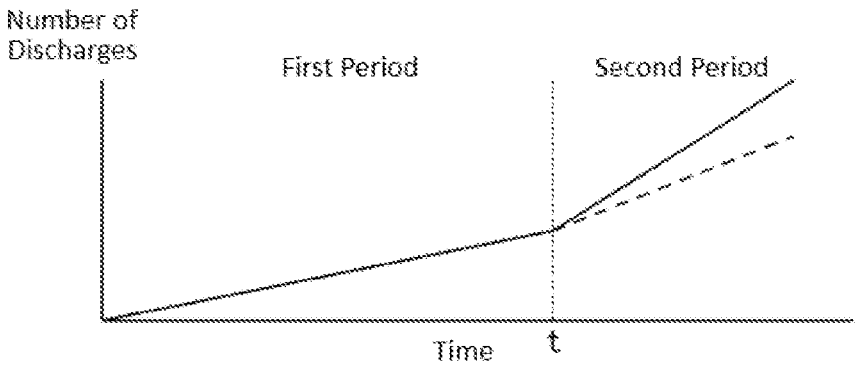
FIG. 2C is a diagram illustrating an inspection example by the inspection device according to the embodiment of the present disclosure.

Next, a third inspection example will be described with reference to FIG. 2C. In the example, a linear function (light emission information) generated by the light emission information generation unit 104 at a time of determination changes as indicated by a broken line in FIG. 2C. In the example, a slope of a solid line and a slope of the broken line are the same as each other in the first period (first comparison result), and a slope of the broken line is smaller than a slope of the solid line in the second period (second comparison result). In this case, a decrease in a light emission intensity is shown in the change of the linear function graph), and it can be determined that a flow rate or an air-fuel ratio of gas and air supplied to the main burner is deviated from a normal value. With respect to such a determination, it is conceivable to take measures such as checking the flow rate and a pressure of the gas and the air supplied to the main burner and checking a regulator, a blower motor, and an actuator of these supply systems.

Fourth Inspection Example

Figure 2D:
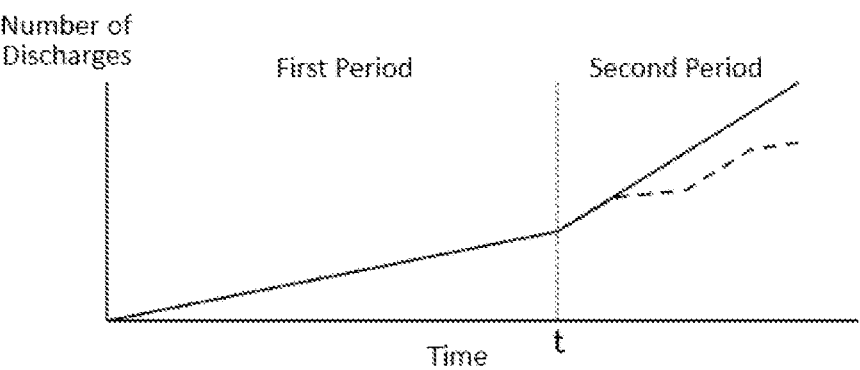
FIG. 2D is a diagram illustrating an inspection example by the inspection device according to the embodiment of the present disclosure.

Next, a fourth inspection example will be described with reference to FIG. 2D. In the example, a linear function (light emission information) generated by the light emission information generation unit 104 at a time of determination changes as indicated by a broken line in FIG. 2D. In the example, a slope of a solid line and a slope of the broken line are the same as each other in the first period (first comparison result), and a slope of the broken line changes in the second period (second comparison result). The results indicate that a light emission intensity of a flame of the main burner is unstable, and it is determined that a flow rate or an air-fuel ratio of gas and air supplied to the main burner fluctuates. With respect to such a determination, it is conceivable to take measures such as checking the flow rate and a pressure of the gas and the air supplied to the main burner and checking a regulator, blower motor, and an actuator of these supply systems.

Fifth Inspection Example

Figure 2E:
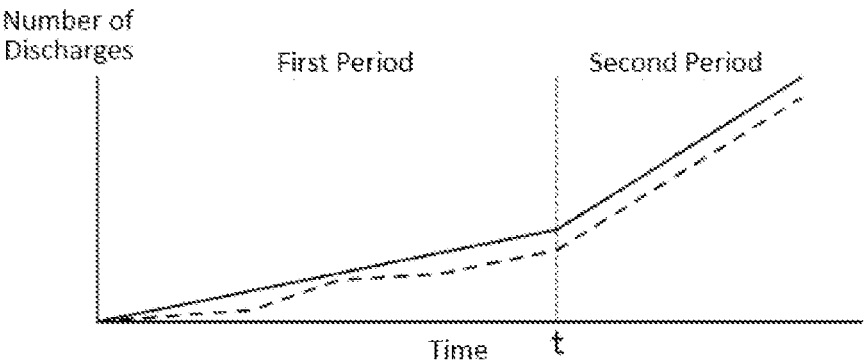
FIG. 2E is a diagram illustrating an inspection example by the inspection device according to the embodiment of the present disclosure.

Next, a fifth inspection example will be described with reference to FIG. 2E. In the example, a linear function (light emission information) generated by the light emission information generation unit 104 at a time of determination changes as indicated by a broken line in FIG. 2E. A slope of a solid line and a slope Hof the broken line are the same as each other in the second period (second comparison result), and a slope of the broken line changes in the first period (first comparison result). The results indicate that a light emission intensity of a flame of the pilot burner is unstable, and it is determined that a flow rate or an air-fuel ratio of gas and air supplied to the pilot burner fluctuates. With respect to such a determination, it is conceivable to take measures such as checking the flow rate and a pressure of the gas and the air supplied to the pilot burner and checking a regulator, a blower motor, and an actuator of these supply systems.

Sixth Inspection Example

Figure 2F:
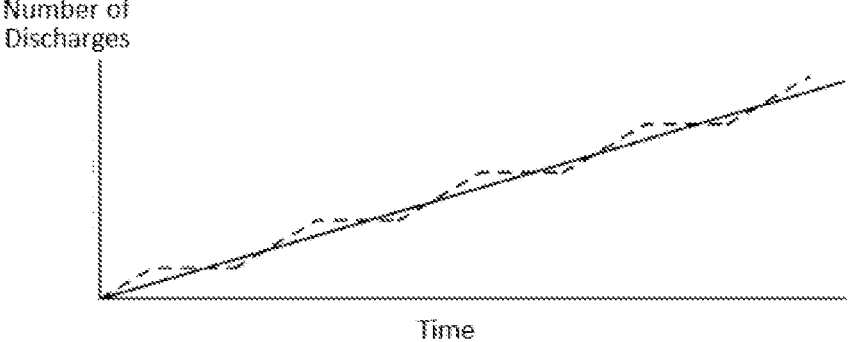
FIG. 2F is a diagram illustrating an inspection example by the inspection device according to the embodiment of the present disclosure.

Next, a sixth inspection example will be described with reference to FIG. 2F. In the example, a linear function (light emission information) generated by the light emission information generation unit 104 at a time of determination changes as indicated by a broken line in FIG. 2F. In the first period and the second period, on the basis of a slope of a solid line in a normal state, the slope of the broken line changes due to a hunting phenomenon to follow the solid line while repeating a time when the slope of the broken line is larger than the slope of the solid line and a time when the slope of the broken line is smaller than the slope of the solid line in a manner of crossing the solid line (first comparison result and second comparison result). It is considered that the results reflect a state in which lift or vibration combustion of a flame is generated and a light emission intensity drifts when supply of air or supply of gas fluctuates in an unstable state. This is also a sign of an abnormality in a device, and in this case, it is conceivable to take a measure such as confirming whether a gas pressure or the supply of the air is stable.

Seventh Inspection Example

Figure 2G:
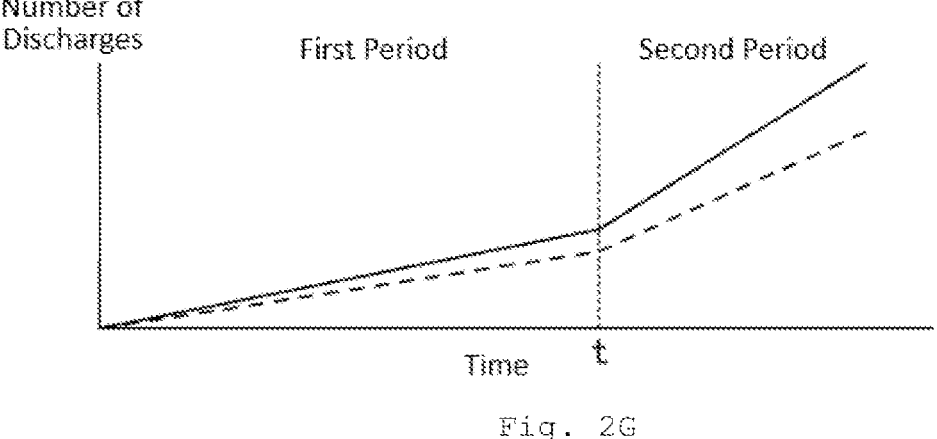
FIG. 2G is a diagram illustrating an inspection example by the inspection device according to the embodiment of the present disclosure.

Next, a seventh inspection example will b described with reference to FIG. 2G. In the example, a linear function (light emission information) generated by the light emission information generation unit 104 at a time of determination changes as indicated by a broken line in FIG. 2G. In both the first period and the second period, a slope of the broken line is smaller than a slope of a solid line (first comparison result and second comparison result). It can be determined that the results are caused by a decrease in a detection sensitivity of a flame sensor. With respect to such a determination, inspection and maintenance such as dirt removal of a light receiving window of the flame sensor may be considered as a measure.

Eighth Inspection Example

Figure 2H:
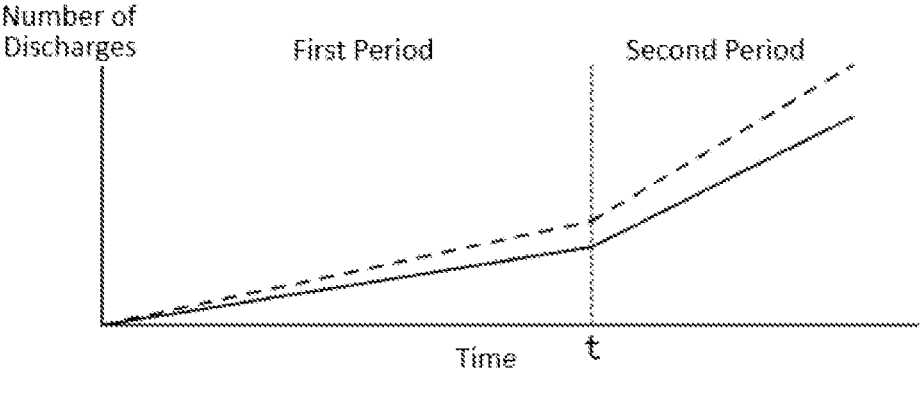
FIG. 2H is a diagram illustrating an inspection example by the inspection device according to the embodiment of the present disclosure.

Next, an eighth inspection example will be described with reference to FIG. 2H. In the example, a linear function (light emission information) generated by the light emission information generation unit 104 at a time of determination changes as indicated by a broken line in FIG. 2H. In both the first period and the second period, a slope of the broken line is larger than a slope of a solid line (first comparison result and second comparison result). The results can be determined to be caused by an increase in suspected discharges due to deterioration of a flame sensor or the like. With respect to such a determination, maintenance such as replacement of the flame sensor can be considered as a measure.

When the flame sensor is replaced as part of maintenance or upkeep due to sensor life, it can be seen whether a sensitivity of the flame sensor is increased or decreased by the above-described inspection. According to the inspection after the replacement of the flame sensor, when there is a change with respect to the reference, the increase or the decrease of the sensitivity can be seen based on the data, and thus the reference can be reset or corrected for operation.

Figure 3A:
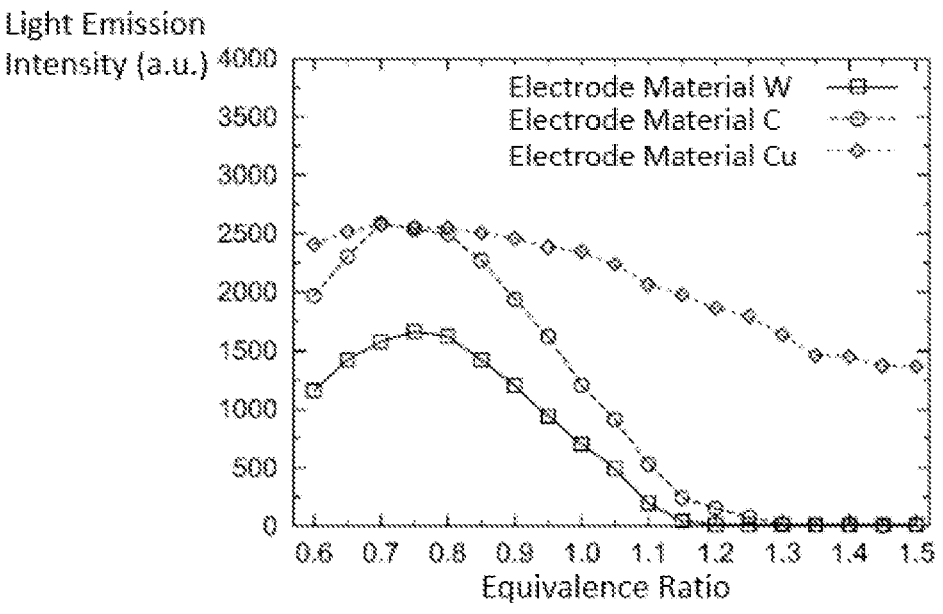
FIG. 3A is a characteristic diagram showing a relation between a mixing degree (equivalence ratio) of combustion gas and air and a light emission intensity (light emission information).
Figure 3B:
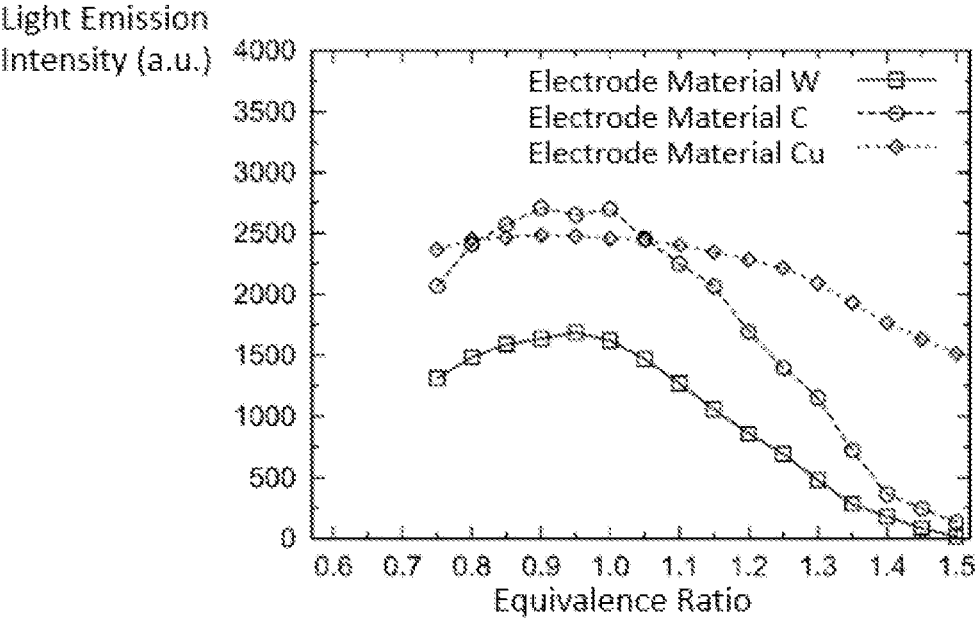
FIG. 3B is a characteristic diagram showing a relation between the mixing degree (equivalence ratio) of the combustion gas and the air and the light emission intensity (light emission information).

Here, when a flow rate of combustion gas to be supplied to the burner is constant, it is considered that a mixing degree (equivalence ratio) of the combustion gas and air and a light emission intensity (light emission information) have relations as shown in FIG. 3A (Takeshi Kishimoto, Haruki Kinase, "Study on characteristics of a flame inspection sensor using ultraviolet band emission of hydrocarbon flame", Commissioned Research by Yamatake Co., Ltd., Mar. 15, 2005). In addition, it is considered that these relations change as shown in FIG. 3B as the flow rate of the combustion gas changes.

In this way, when an amount of combustion gas supplied to the burner changes and an air ratio changes, the light emission intensity (light emission information) changes. In other words, the change in the light emission information indicates a change in the supply amount of the combustion gas or the air ratio. For example, a state in which the supply amount of the combustion gas or the air ratio is deviated from a reference indicates that there is a malfunction in a device to be managed or a control system that controls the supply amount of the combustion gas and the air ratio. Such a state is shown in the change in the light emission information.

Figure 4:
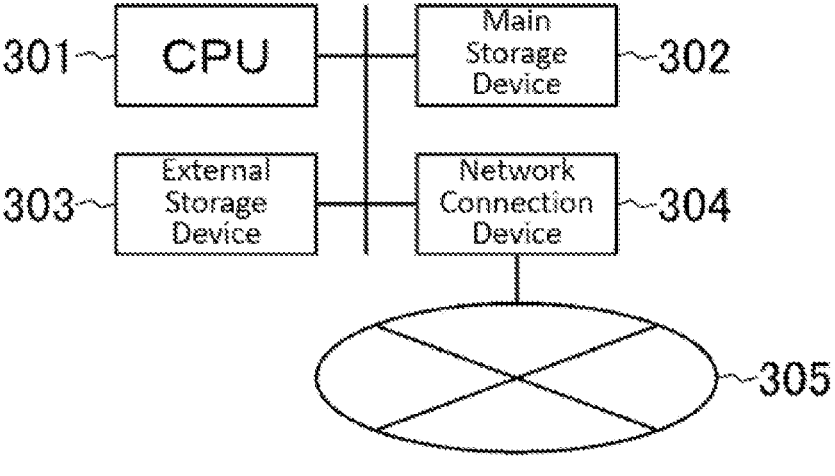
FIG. 4 is a configuration diagram showing a hardware configuration of a light emission information generation unit 104 and a determination unit 105 of a flame measurement device according to the embodiment of the present disclosure.

As shown in FIG. 4, the light emission information generation unit 104 and the determination unit 105 according to the above-described embodiment may be a computer device including a central processing unit (CPU) 301, a main storage device 302, an external storage device 303, a network connection device 304, and the like. The network connection device 304 is connected to a network 305. The CPU 301 operates (executes a program) by loading a program in the main storage device 302 of the computer device, thereby implementing functions of the light emission information generation unit 104 and the determination unit 105.

As described above, according to the present disclosure, the information obtained based on the value obtained by dividing the total of the number of discharges per unit time by the total measurement time is generated as the light emission information, and the state of the combustion apparatus to be inspected is determined based on the light emission information, and thus it is possible to grasp the state of the combustion apparatus, such as identifying an abnormality occurring in the combustion apparatus, based on the flame state of the burner.

The present disclosure is not limited to the above-described embodiment, and it is clear that various modifications and a combination thereof can be implemented by those skilled in the art within the technical idea of the present disclosure.

DESCRIPTION OF REFERENCE NUMERALS AND SIGNS

101: flame sensor, 102: application voltage generation unit, 103: discharge number measurement unit, 104: light emission information generation unit, 105: determination unit, 106: power supply, 107: display unit, 131: flame

The invention claimed is:

1. An inspection device comprising:
   a flame sensor configured to detect ultraviolet rays generated from a flame generated by a combustion apparatus;
   an application voltage generation unit configured to periodically apply a drive voltage to an electrode of the flame sensor;
   a discharge number measurement unit configured to measure the number of discharges of the flame sensor per unit time;

a light emission information generation unit configured to generate, as light emission information, information obtained based on a value obtained by dividing a total of the number of discharges per unit time measured by the discharge number measurement unit by a total measurement time; and
   a determination unit configured to determine a state of the combustion apparatus based on the light emission information,
   wherein
   the determination unit is configured to determine the state of the combustion apparatus by using the light emission information generated by the light emission information generation unit as a reference at a normal time, using the light emission information generated by the light emission information generation unit as determination information at a time of determination, and comparing the reference with the determination information,
   the combustion apparatus includes a pilot burner and a main burner, and is configured to ignite the pilot burner, and thereafter ignite the main burner with a pilot flame of the ignited pilot burner, and
   the determination unit is configured to determine the state of the combustion apparatus based on a first comparison result obtained by comparing the reference with the determination information in a first period from start of ignition of the pilot burner to ignition of the main burner, and a second comparison result obtained by comparing the reference with the determination information in a second period after the main burner is ignited.

2. The inspection device according to claim 1, wherein the determination unit is configured to determine the state of the combustion apparatus based on a third comparison result obtained by comparing an ignition time point of the pilot burner that is configured to be identified by the reference and an ignition time point of the pilot burner that is configured to be identified by the determination information in the first period from the start of the ignition of the pilot burner to the ignition of the main burner, in addition to the first comparison result and the second comparison result.

3. The inspection device according to claim 1, wherein the determination unit is configured to determine the state of the combustion apparatus as being such that a flow rate or an air-fuel ratio of a fuel and air supplied to the pilot burner is deviated from a normal value in a case in which the first comparison result indicates that the determination information is smaller than the reference and the second comparison result indicates that the reference and the determination information are the same as each other.

4. The inspection device according to claim 1, wherein the determination unit is configured to determine the state of the combustion apparatus as being such that a flow rate or an air-fuel ratio of a fuel and air supplied to the main burner is deviated from a normal value in a case in which the second comparison result indicates that the determination information is smaller than the reference and the first comparison result indicates that the reference and the determination information are the same as each other.

5. The inspection device according to claim 1, wherein the determination unit is configured to determine the state of the combustion apparatus as being such that a flow rate or an air-fuel ratio of a fuel and air supplied to the main burner fluctuates in a case in which the first comparison result indicates that the reference and the determination information are the same as each other and the second comparison result fluctuates within the second period.

6. The inspection device according to claim 1, wherein the determination unit is configured to determine the state of the combustion apparatus as being such that a flow rate or an air-fuel ratio of a fuel and air supplied to the pilot burner fluctuates in a case in which the second comparison result indicates that the reference and the determination information are the same as each other and the first comparison result fluctuates within the first period.

7. The inspection device according to claim 1, wherein the determination unit is configured to determine the state of the combustion apparatus as being such that supply of air or supply of a fuel fluctuates in an unstable state in a case in which a magnitude relation between the reference and the determination information is alternately inverted in the first comparison result and a magnitude relation between the reference and the determination information is alternately inverted in the second comparison result.

8. The inspection device according to claim 1, wherein the determination unit is configured to determine the state of the combustion apparatus as being such that a detection sensitivity of the flame sensor has decreased in a case in which the first comparison result indicates that the determination information is smaller than the reference and the second comparison result indicates that the determination information is smaller than the reference.

9. The inspection device according to claim 1, wherein the determination unit is configured to determine the state of the combustion apparatus as being such that the number of suspected discharges caused by deterioration of the flame sensor has increased in a case in which the first comparison result indicates that the determination information is larger than the reference and the second comparison result indicates that the determination information is larger than the reference.

10. The inspection device according to claim 1, wherein the light emission information generation unit is configured to generate, as the light emission information, a linear function expressed by a formula in which the total of the number of discharges per unit time measured by the discharge number measurement unit is divided by the total measurement time.

11. The inspection device according to claim 10, wherein the determination unit is configured to determine the state of the combustion apparatus based on a third comparison result obtained by comparing an ignition time point of the pilot burner that is configured to be identified by the reference and an ignition time point of the pilot burner that is configured to be identified by the determination information in the first period from the start of the ignition of the pilot burner to the ignition of the main burner, in addition to the first comparison result and the second comparison result.

12. The inspection device according to claim 10, wherein the determination unit is configured to determine the state of the combustion apparatus as being such that a flow rate or an air-fuel ratio of a fuel and air supplied to the pilot burner is deviated from a normal value in a case in which the first comparison result indicates that the determination information is smaller than the reference and the second comparison result indicates that the reference and the determination information are the same as each other.

13. The inspection device according to claim 10, wherein the determination unit is configured to determine the state of the combustion apparatus as being such that a flow rate or an air-fuel ratio of a fuel and air supplied to the main burner is deviated from a normal value in a case in which the second comparison result indicates that the determination information is smaller than the reference and the first comparison result indicates that the reference and the determination information are the same as each other.

14. The inspection device according to claim 10, wherein the determination unit is configured to determine the state of the combustion apparatus as being such that a flow rate or an air-fuel ratio of a fuel and air supplied to the main burner fluctuates in a case in which the first comparison result indicates that the reference and the determination information are the same as each other and the second comparison result fluctuates within the second period.

15. The inspection device according to claim 10, wherein the determination unit is configured to determine the state of the combustion apparatus as being such that a flow rate or an air-fuel ratio of a fuel and air supplied to the pilot burner fluctuates in a case in which the second comparison result indicates that the reference and the determination information are the same as each other and the first comparison result fluctuates within the first period.

16. The inspection device according to claim 10, wherein the determination unit is configured to determine the state of the combustion apparatus as being such that supply of air or supply of a fuel fluctuates in an unstable state in a case in which a magnitude relation between the reference and the determination information is alternately inverted in the first comparison result and a magnitude relation between the reference and the determination information is alternately inverted in the second comparison result.

* * * * *